United States Patent [19]

Graham, Jr. et al.

[11] 3,806,567

[45] Apr. 23, 1974

[54] METHOD FOR PRODUCING REINFORCED, CELLULAR SLABS BY EXTRUSION

[76] Inventors: Andrew E. Graham, Jr., 2921 Spring Valley Rd., Lancaster, Pa. 17601; Rickie L. Sitler, R.D. 1, Wrightsville, Pa. 17368

[22] Filed: Mar. 12, 1971

[21] Appl. No.: 123,739

[52] U.S. Cl. ............... 264/47, 161/161, 264/45, 264/48, 264/52, 264/54, 264/DIG. 14, 264/DIG. 57
[51] Int. Cl. ..................... B29d 27/00, B29f 3/08
[58] Field of Search ............ 264/45, 48, 53, 52, 54, 264/46, 47; 161/161

[56] References Cited
UNITED STATES PATENTS

| | | | |
|---|---|---|---|
| 3,413,388 | 11/1968 | Lux et al. | 264/46 |
| 3,094,449 | 6/1963 | Sisson | 264/47 X |
| 3,363,034 | 1/1968 | Noland et al. | 264/48 |
| 3,413,387 | 11/1968 | Ohsol | 264/46 |
| 3,431,163 | 3/1969 | Gilbert | 161/161 |
| 3,387,067 | 6/1968 | McCurdy | 264/53 |
| 3,426,111 | 2/1969 | Simpson | 264/48 |

*Primary Examiner*—Donald E. Czaja
*Assistant Examiner*—H. S. Cockeram

[57] ABSTRACT

A thick, foamed plastic slab having a smooth surface, a densified core, and rounded edges is produced by extruding foamable, substantially unplasticized poly(vinyl chloride) in the form of a tube into a region of lower pressure, immediately cooling the outer surface of the tube while allowing entrapped gases to cause formation of a rough-textured inner surface thereon and then compressing the tube at right angles to the direction of extrusion.

1 Claim, 2 Drawing Figures

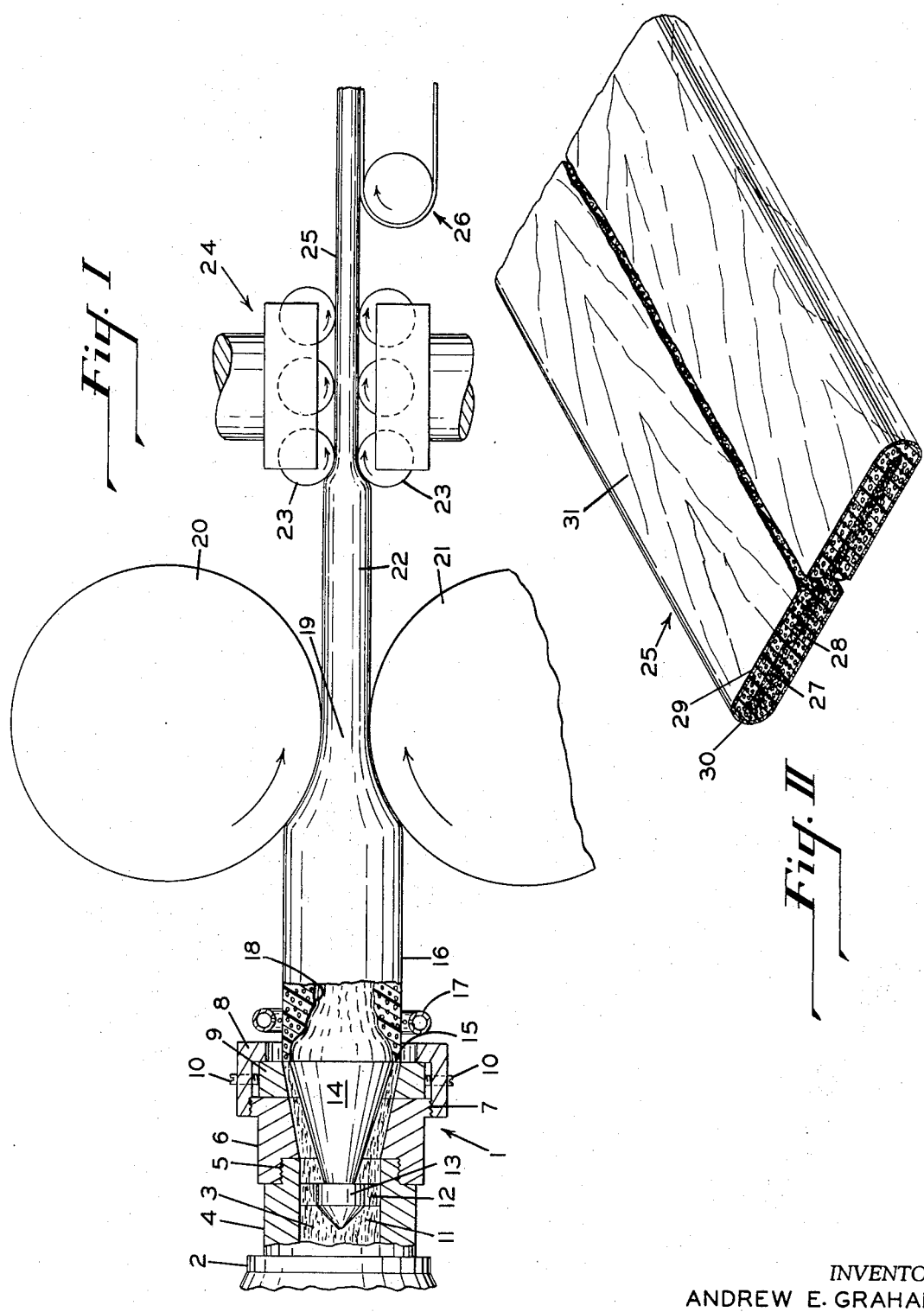
PATENTED APR 23 1974
3,806,567
Fig. I
Fig. II
INVENTOR
ANDREW E. GRAHAM
RICKIE L. SITLER
BY
ATTORNEY

METHOD FOR PRODUCING REINFORCED, CELLULAR SLABS BY EXTRUSION

CROSS-REFERENCE TO RELATED APPLICATION

This application is related to copending application Ser. No. 127,258, filed Mar. 23, 1971, entitled "Foamed Poly(Vinyl Chloride) Drawer Sides," in the names of J. Lampe and E. Wall.

BACKGROUND OF THE INVENTION

1. Field of the Invention

This invention relates to the formation of thick bodies of foamed, substantially unplasticized poly(vinyl chloride) material by extrusion. More particularly, it relates to the formation of a thick, smooth-surfaced, round edged, reinforced, foamed plastic slab, having a densified core, by means of ordinary extrusion equipment and techniques.

2. Description of the Prior Art

It is now generally accepted that extrusion methods are the most practical for the production of foamed products. It is also known that thin, foamed plastic sheets, small diameter rods and the like, can be produced using the ordinary existing extruding equipment and techniques. The production of thick, extruded, foamed plastic shapes, however, has presented many problems such as control of surface irregularities; density variations in the transverse direction; control of desired production rates using moderate sized equipment; the need for complicated and expensive die structures and related equipment; control of rate production while still maintaining proper pressure in the extruding equipment; working with materials which have a high viscosity at all temperatures, and further have a narrow range between the necessary working temperature and the temperature at which the material becomes unworkable; and, uniform heating of thick, extruded shapes.

The prior art has developed many expedients to deal with the foregoing problems. For example, U.S. Pat. No. 3,413,387 discloses a process for forming thick, foamed plastic shapes free from surface irregularities and density variations which comprises extruding radially spaced-apart concentric tubes of foamable plastic which, upon foaming, expand to close the radial spaces. The tubes are then slightly compressed at right angles to the direction of extrusion to assure that the plastic will coalesce along the junctions between the tubes.

U.S. Pat. No. 2,740,157 discloses another process whereby thick, foamed plastic sheets having rounded edge portions are formed by feeding the foamable plastic material from a pressurized chamber into a region of lower pressure between parallel upper and lower shaping members where it is allowed to flow or spread out without contacting any vertical confining members.

It was formerly known that the ultimate cross section of an extruded foam was relative to the size of the orifice from which it originated. However, it was found that when using a large orifice, adequate pressure could not be maintained within the extruding equipment unless the feed rate was increased. As an example of one attempt to combat these difficulties, U.S. Pat. No. 3,121,130 discloses a process for producing thick, foamed plastic products wherein the foamable material is extruded through multiple orifices into individual elements which are in close proximity to each other. Upon expansion, these elements fuse or coalesce into an integral shape.

U.S. Pat. No. 3,426,111 discloses a process for forming a foamed plastic sheet wherein the foamable material is extruded through an annular orifice into a region of lower pressure; the surfaces are then contacted by an annular cooling surface; the tube is stretched over a mandrel and then slit.

U.S. Pat. No. 3,346,686 discloses a method for forming a foamed plastic sheet having a fused central section which comprises heating one surface of each of two foamed sheets and then pressing the heated surfaces into contact with each other.

SUMMARY OF THE INVENTION

A thick cellular plastic slab having rounded edges, a densified core and a smooth outer surface is produced by the method of this invention wherein substantially unplasticized poly(vinyl chloride) is extruded through a single annular orifice around a single core pin into a region of lower pressure to form a tubular body. As the tube emerges from the extruder, the outer surface thereof is cooled by means of air issuing from openings in a tube surrounding the plastic tube. The outer surface of the plastic tube is thus solidified and smoothed, allowing the entrapped gases within the material of the tube to expand inwardly, causing formation of a rough textured inner surface thereon. The tube is then preflattened to cause the rough textured surfaces to interlock and coalesce, after which the tube is further consolidated to form a thick, reinforced, cellular slab.

By this invention, it can be readily seen that a simple and straightforward method for producing thick slabs of cellular, rigid poly(vinyl chloride) having a densified core and rounded edges hss been discovered which eliminates the problems experienced by the prior art. In carrying out this method, no sophisticated die structure is required, allowing use of ordinary extrusion equipment and techniques. Further, problems associated with working with unplasticized or substantially unplasticized poly(vinyl chloride) are avoided. By this method the plastic material may be moved at controlled desired production rates through the extruder die without deviating from the narrow temperature range required for successful workability of the rigid poly(vinyl chloride). Since only the normal die opening is required, there is no problem with maintaining the proper pressure in the extruding equipment. Uniform heating is no problem since the thickness of the product is achieved by flattening and consolidating the tube after it has been formed. Therefore, the need for heat to penetrate a thick body of foamed material is not present. Density variations and surface irregularities are also minimized by this method.

It is therefore the primary object of this invention to provide an improved method for forming a thick, foamed plastic flab having a dense core, a smooth outer surface and rounded edges. It is a further object of this invention to provide a simple, relatively inexpensive and efficient method for producing such a reinforced cellular slab from rigid poly(vinyl chloride).

In the drawings:

FIG. 1 is a partially broken-away side elevational view of an apparatus for practicing the method of this invention.

FIG. 2 is a broken isometric view of the product formed by the method of this invention.

In FIG. 1 there is shown the die assembly 1 of a conventional extruder 2 for extruding a foamable poly(vinyl chloride) composition 3. Die assembly 1 includes a die base 4 having a threaded, reduced diameter extension 5. Stationary die member 6 is screwed onto threaded extension 5 of die base 4. Stationary die member 6 has a screw-threaded, enlarged diameter portion 7 onto which is fastened a die cap 8. A movable sliding die 9 is adjustably held between the stationary die 6 and the die cap 8 by means of screw adjusting members 10. Centered in passageway 11 of the die assembly 1 by means of spokes 12 is mandrel 13 adapted to support a truncated, cone-shaped core pin 14. As the foamable plastic composition is forced by the extruder 2 through passageway 11 in the die assembly 1, it flows around the mandrel 13 and pin 14 and out of an annular opening 15 between pin 14 and movable die 9, forming a tube 16. By having die portion 9 movable, it can be adjusted by means of screws 10 with respect to pin 14 to assure establishment of a uniform annular opening 15. In addition, should the occasion arise during a run, the die member 9 can be repositioned to compensate for overexpansion or irregular flow.

It is known by those skilled in the art that the foamable resin delivered by the extruder to the discharge end thereof must be fully plasticized to uniform viscosity. This is normally accomplished by means of a screw having a helical flight or flights and snugly, but rotatably, disposed in the extruder housing. As is well known, the screw is provided for the purpose of heating and preplasticizing the resin by means of agitation, pressure and internal friction, in combination with heating by any additional heating elements which may be required, while the resin is being advanced by the screw from one end of the preplasticizing chamber to the other end thereof. Variations in the number, pitch and spacing of the helical flights of the extruder screw, as well as variations in the screw diameter, all for the aforesaid purpose, are well known in the art.

Almost immediately after the tube 16 emerges from the die orifice 15, it is hit with an air blast emanating from a surrounding perforated tubing 17 located adjacent die assembly 1 and connected to a source (not shown) of pressurized air. This action solidifies and smooths the outer surface of the tube. Cell formation and full wall expansion occur at this same point in time. The inner surface 18 of the tube 16, due to its undergoing stress from entrapped gases and rubbing against the pin 14, acquires a texture of marked roughness which aids in the formation of an interlocking lamination.

About 12 inches downstream of the die assembly 1 the tube 16 is preflattened as it passes through the nip 19 of counter-rotating rolls 20 and 21. This forces the upper and lower portions of the textured inner surface 18 of tube 16 into contact, causing interlocking and coalescence thereof. The preflattened tube 22 is then passed between roller platens 23 of consolidating press 24 to complete formation of the reinforced foam slab 25. The slab 25 is then passed by means of conveyor 26 to another location for any subsequent use.

As shown in FIG. 2 of the drawings, the slab 25 includes a single densified core 27, surrounding cellular material 28, a densified skin 29 and rounded edges 30. A decorative design 31, such as a simulated wood grain, may be applied to the surface of skin 29 by known methods.

The invention is intended for primary applicability to substantially unplasticized poly(vinyl chloride), frequently referred to in the trade as "hard PVC" or "rigid PVC" and illustrated by such material as Exon 965, manufactured and sold by Firestone Plastics Company, or Diamond PVC 40, manufactured by Diamond Chemical Company. Nevertheless, it is conceivable that the process to which this invention relates is applicable in its broader aspects to any resin having a high minimum viscosity and a narrow working temperature range.

The particular material upon which said process is intended primarily to operate may be illustrated by: (a) pure, unplasticized poly(vinyl chloride) resin; (b) a stabilizer, such as tribasic lead sulfate; (c) a lubricant; and (d) a coloring pigment, if desired.

Alternatively, the material may comprise each of the foregoing components plus another plastic material, as butadiene or styrene, which may be added to improve certain physical properties, such as impact strength, but which may reduce chemical or heat resistivity. In either case, the term "unplasticized" shall be taken to include any case where the plasticizer which is present, if any, has no measurable effect upon the plastic material in that it does not appreciably alter the physical properties of the finally-formed part.

To further illustrate this invention, and not by way of limitation, the following example is given. All parts are by weight.

EXAMPLE

The following formulation was prepared for extrusion by blending in a tumbling drum. Thirty minutes rotation at 30 rpm adequately mixed the ingredients.

| Ingredients | Parts by Weight |
| --- | --- |
| Polypropylene modified poly(vinyl chloride)resin | 67 |
| Poly(vinyl chloride) resin | 33 |
| Expandable polystyrene pellets | 12 |
| Methacrylate-butadiene-styrene copolymer impact modifier | 9 |
| General purpose polystyrene melt strength aid | 5 |
| Tribasic lead sulfate stabilizer | 3 |
| Azodicarbonamide nucleating agent | .065 |
| Iron oxide pigment | .065 |
| Cadmium yellow pigment | .065 |

The above mixture was fed to the extruder where it was heated and preplasticized by the screw and heating means and passed through the annular orifice of the die in the form of a tube. Immediately upon issuance from the die, the outer surface of the tube was solidified and smoothed by means of a blast of cold air from a perforated tube surrounding the plastic tube. The plastic tube was then preflattened and further consolidated to form a thick, smooth-surfaced, cellular slab having a densified core and outer skin and rounded edge portions. The slab so formed was then embossed with a wood grain design and shade wiped with a dark ink, after which a clear protective coating was applied. The product so formed readily lends itself to normal woodworking methods and may be ideally used as a direct wood substitution in some areas of furniture construction, etc.

We claim:
1. The method for producing a cellular thermoplastic resinous rigid slab having a single densified core and a smooth densified surface comprising, extruding a foamable thermoplastic resinous composition of unplasticized poly(vinyl chloride) through a single annular extrusion orifice around a single core pin into a region of lower pressure wherein the material foams to form a tubular body containing a multiplicity of closed cells, the tube having an inner surface and an outer surface, immediately after extruding, contacting the outer surface of the heat plasticized thermoplastic resinous foam by the projection of cool air while cell formation and full wall expansion are occurring to solidify and smooth the outer surface thereof while permitting entrapped gases therein to form a rough inner surface texture thereon, flattening by the exertion of pressure the tube to join together the rough inner surface of the tube to form a slab having a densified core and skin sections and rounded edge portions.

* * * * *